US011808203B2

(12) United States Patent
Suciu et al.

(10) Patent No.: US 11,808,203 B2
(45) Date of Patent: Nov. 7, 2023

(54) OFFSET CORES FOR GAS TURBINE ENGINES

(71) Applicant: RTX Corporation, Farmington, CT (US)

(72) Inventors: Gabriel L. Suciu, Glastonbury, CT (US); James D. Hill, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 37 days.

(21) Appl. No.: 16/570,923

(22) Filed: Sep. 13, 2019

(65) Prior Publication Data

US 2020/0025071 A1  Jan. 23, 2020

Related U.S. Application Data

(62) Division of application No. 14/921,575, filed on Oct. 23, 2015, now Pat. No. 10,415,466.

(Continued)

(51) Int. Cl.
| | |
|---|---|
| *F02C 3/14* | (2006.01) |
| *F02C 3/04* | (2006.01) |
| *F02K 3/00* | (2006.01) |
| *F01D 25/24* | (2006.01) |
| *F01D 25/30* | (2006.01) |

(Continued)

(52) U.S. Cl.
CPC ............... *F02C 3/14* (2013.01); *F01D 25/24* (2013.01); *F01D 25/30* (2013.01); *F02C 3/04* (2013.01); *F02C 3/10* (2013.01); *F02K 3/00* (2013.01); *F02K 3/04* (2013.01); *F05D 2220/36* (2013.01); *F05D 2240/24* (2013.01); *F05D 2240/35* (2013.01); *F05D 2240/60* (2013.01); *F05D 2250/314* (2013.01); *Y02T 50/60* (2013.01)

(58) Field of Classification Search
CPC ...... F02C 3/00; F02C 3/04; F02C 3/10; F02C 3/14; F02K 3/04; F02K 3/06
See application file for complete search history.

(56) References Cited

U.S. PATENT DOCUMENTS

| | | | |
|---|---|---|---|
| 2,704,434 | A | 3/1955 | Schmitt |
| 3,368,352 | A | 2/1968 | Hewson |

(Continued)

FOREIGN PATENT DOCUMENTS

| | | |
|---|---|---|
| EP | 2915988 A1 | 9/2015 |
| WO | 2014074135 | 5/2014 |

OTHER PUBLICATIONS

European Search Report for Application No. EP 15 19 1618.

*Primary Examiner* — Arun Goyal
(74) *Attorney, Agent, or Firm* — CANTOR COLBURN LLP

(57) ABSTRACT

A gas turbine engine includes a propulsor with a power turbine, a power turbine shaft extending forward therefrom defining a centerline axis, and a fan driven by the power turbine shaft. The fan is aligned with the centerline axis forward of the power turbine and is operatively connected to be driven by the power turbine through the power turbine shaft. A gas generator operatively connected to the propulsor is included downstream from the fan and forward of the power turbine, wherein the gas generator defines a generator axis offset from the centerline axis. The gas generator is operatively connected to the power turbine to supply combustion products for driving the power turbine.

6 Claims, 2 Drawing Sheets

Related U.S. Application Data

(60) Provisional application No. 62/069,234, filed on Oct. 27, 2014.

(51) Int. Cl.
    *F02C 3/10*    (2006.01)
    *F02K 3/04*    (2006.01)

(56) References Cited

U.S. PATENT DOCUMENTS

| | | | | |
|---|---|---|---|---|
| 5,139,545 | A * | 8/1992 | Mann | F02C 7/052 |
| | | | | 55/306 |
| 6,508,052 | B1 * | 1/2003 | Snyder | B01D 45/08 |
| | | | | 137/15.1 |
| 6,901,739 | B2 * | 6/2005 | Christopherson | F01D 17/105 |
| | | | | 60/226.3 |
| 8,365,514 | B1 * | 2/2013 | Kupratis | F02C 3/073 |
| | | | | 60/226.1 |
| 9,828,911 | B2 | 11/2017 | Burghardt | |
| 10,024,235 | B2 * | 7/2018 | Suciu | F02C 3/14 |
| 2006/0185346 | A1 | 8/2006 | Rolt | |
| 2010/0155526 | A1 | 6/2010 | Negulescu | |
| 2014/0074135 | A1 | 3/2014 | Hart et al. | |
| 2016/0115866 | A1 | 4/2016 | Suciu et al. | |

* cited by examiner

OFFSET CORES FOR GAS TURBINE ENGINES

CROSS REFERENCE TO RELATED APPLICATIONS

This application is a division of U.S. patent application Ser. No. 14/921,575 filed on Oct. 23, 2015, which claims the benefit of U.S. Provisional Patent Application Ser. No. 62/069,234 filed on Oct. 27, 2014, the entire contents each of which are incorporated herein by reference thereto.

BACKGROUND

1. Field

The present disclosure relates to gas turbine engines, and more particularly to turbofan engines with offset cores, for example.

2. Description of Related Art

Traditionally, gas turbine engines include a turbine that drives a fan to draw air into the engine as the turbine rotates. The air is typically sectioned between a bypass duct and a core flow path that leads through a compressor section and a combustor section. Products of this combustion pass across turbine rotors which are driven to rotate, and in turn rotate the compressor and fan section. Historically, the fan and compressor section have been mounted concentrically. Traditionally, one turbine section drove both the compressor section and the fan at the same speed. This has been improved upon with a geared turbofan and two and three spool engines that allow for some uncoupling between turbine speed and fan and compressor speed. More recently it has been proposed to considerably increase the diameter of the fan section and reduce the core flow path and engine core, e.g. the compressor section, in an effort to improve engine efficiency. As the core size decreases relative to the fan size, it tends to be difficult to design with a large turbine shaft passing down the center of a small compressor section.

Such conventional methods and systems have generally been considered satisfactory for their intended purpose. However, there is still a need in the art for improved gas turbine engines.

SUMMARY OF THE DISCLOSURE

A gas turbine engine includes a propulsor with a power turbine, a power turbine shaft extending forward therefrom defining a centerline axis, and a fan driven by the power turbine shaft. The fan is aligned with the centerline axis forward of the power turbine and is operatively connected to be driven by the power turbine through the power turbine shaft. A gas generator operatively connected to the propulsor is included downstream from the fan and forward of the power turbine, wherein the gas generator defines a generator axis offset from the centerline axis. The gas generator is operatively connected to the power turbine to supply combustion products for driving the power turbine.

The gas generator can include a compressor section, a combustor section, a turbine section and a turbine shaft defined along the generator axis. The gas turbine engine can include a fan case radially outward of the fan defining a fan inlet along the centerline axis. The gas generator can be in fluid communication with the fan inlet through a duct, wherein at least a portion of the duct is angled relative to the centerline axis and the generator axis. The gas turbine engine can include a transition duct defined between an exhaust outlet of the gas generator and an inlet of the power turbine for providing fluid communication therebetween. The transition duct can be angled relative to the centerline axis and the generator axis.

In accordance with certain embodiments, the gas turbine engine includes an outer core cowl radially inward of the fan case. The outer core cowl defines an axially extending splitter for dividing fluid flow entering at the fan inlet into a core gas path and a bypass flow path. The core gas path includes a core inlet defined radially between the splitter and an inner core cowl. The core inlet is circumferentially segmented into a first duct inlet and a second duct inlet. The gas generator is defined in the core gas path downstream of the core inlet in fluid communication with the first duct inlet through a first duct.

The second duct inlet can be in fluid isolation from the gas generator. A thermal management system can be defined in a second duct. The thermal management system is in fluid communication with the core gas path and the second duct inlet through the second duct. The thermal management system can include a heat-exchanger disposed within the second duct aft of the second duct inlet and forward of a second duct outlet. The second duct can include an exhaust portion with an exhaust outlet separate from and upstream of an exhaust outlet of a power turbine. The exhaust portion can be angled relative to the centerline axis. The first duct inlet can be defined in a bottom half of the core inlet, or any other suitable portion of the core inlet. The gas generator can define a generator axis that is substantially parallel to the centerline axis. The gas turbine engine can include a hub defined forward of the core inlet. The hub can be configured to direct flow to the first and second duct inlets. The first and second duct inlets can be configured to apportion incoming fluid flow evenly between the first duct inlet and the second duct inlet, for example.

In accordance with other embodiments, a gas turbine engine includes an outer core cowl. The outer core cowl is radially inward of the fan case. The first duct is defined between the core inlet and the gas generator for fluid communication therebetween. The gas generator can include a compressor section, a combustor section aft of the compressor section, and a turbine section aft of the combustor section. The compressor section, the combustor section, and the turbine section can be aligned with the generator axis.

In one embodiment, a gas turbine engine is provided. The gas turbine engine having: a propulsor including a power turbine, a power turbine shaft extending forward therefrom defining a centerline axis, and a fan driven by the power turbine shaft, wherein the fan is aligned with the centerline axis and is defined forward of the power turbine; and a gas generator operatively connected to the propulsor downstream from the fan and forward of the power turbine, wherein the gas generator defines a generator axis offset from the centerline axis.

In addition to one or more of the features described above, or as an alternative to any of the foregoing embodiments, the generator axis may be substantially parallel to the centerline axis.

In addition to one or more of the features described above, or as an alternative to any of the foregoing embodiments, further embodiments may include a fan case radially outward of the fan defining a fan inlet along the centerline axis, wherein the gas generator is in fluid communication with the fan inlet through a duct, wherein at least a portion of the duct is angled relative to the centerline axis and the generator axis.

In addition to one or more of the features described above, or as an alternative to any of the foregoing embodiments, further embodiments may include a transition duct defined between an exhaust outlet of the gas generator and an inlet of the power turbine for providing fluid communication therebetween, wherein the transition duct is angled relative to the centerline axis and the generator axis.

In yet another embodiment, a gas turbine engine is provided. The gas turbine engine having: a fan case defining a centerline axis, the fan case including a fan inlet; outer core cowl radially inward of the fan case defining an axially extending splitter for dividing fluid flow entering at the fan inlet into a core gas path and a bypass flow path, wherein the core gas path includes a core inlet defined radially between the splitter and an inner core cowl; and a gas generator defined in the core gas path downstream of the core inlet, wherein the core inlet is circumferentially segmented into a first duct inlet and a second duct inlet, wherein the gas generator is in fluid communication with the first duct inlet through a first duct.

In addition to one or more of the features described above, or as an alternative to any of the foregoing embodiments, wherein the second duct inlet may be in fluid isolation from the gas generator.

In addition to one or more of the features described above, or as an alternative to any of the foregoing embodiments, wherein the gas generator defines a generator axis that is substantially parallel to the centerline axis.

In addition to one or more of the features described above, or as an alternative to any of the foregoing embodiments, further embodiments may include a hub defined forward of the core inlet configured to direct flow to the first and second duct inlets, wherein the first and second duct inlets are configured to apportion incoming fluid flow evenly between the first duct inlet and the second duct inlet.

In addition to one or more of the features described above, or as an alternative to any of the foregoing embodiments, further embodiments may include a transition duct for fluid communication between an exhaust outlet of the gas generator and an inlet of a power turbine aft of the gas generator.

In addition to one or more of the features described above, or as an alternative to any of the foregoing embodiments, wherein the first duct inlet is defined in a bottom half of the core inlet.

In addition to one or more of the features described above, or as an alternative to any of the foregoing embodiments, further embodiments may include a thermal management system defined in a second duct, wherein the thermal management system is in fluid communication with the second duct inlet and the core gas path through the second duct.

In addition to one or more of the features described above, or as an alternative to any of the foregoing embodiments, wherein the second duct includes an exhaust portion with an exhaust outlet separate from and upstream of an exhaust outlet of a power turbine, wherein the exhaust portion is angled relative to the centerline axis.

In yet another embodiment, a gas turbine engine is provided. The gas turbine engine having: a propulsor including a power turbine defining a centerline axis, and a fan aligned with the centerline axis forward of the power turbine operatively connected to be driven by the power turbine; a fan case defined radially outward of the fan aligned with the centerline axis, wherein the fan case includes a fan inlet; an outer core cowl radially inward of the fan case defining an axially extending splitter for dividing fluid flow entering at the fan inlet into a core gas path and a bypass flow path, wherein the core gas path includes a core inlet defined radially between the splitter and an inner core cowl; a gas generator defined in the core gas path aft of the core inlet downstream from the fan and forward of the power turbine, wherein the gas generator defines a generator axis offset from the centerline axis; a first duct between the core inlet and the gas generator for fluid communication therebetween; and a transition duct between an exhaust outlet of the gas generator and an inlet of the power turbine for fluid communication therebetween.

In addition to one or more of the features described above, or as an alternative to any of the foregoing embodiments, wherein the core inlet is circumferentially segmented into a first duct inlet and a second duct inlet, wherein the second duct inlet is in fluid isolation from the gas generator, and wherein the first duct inlet is in fluid communication with the gas generator through the first duct.

In addition to one or more of the features described above, or as an alternative to any of the foregoing embodiments, further embodiments may include a hub defined forward of the core inlet configured to direct flow to the first and second duct inlets, wherein the first and second duct inlets are configured to apportion incoming fluid flow evenly between the first duct inlet and the second duct inlet.

In addition to one or more of the features described above, or as an alternative to any of the foregoing embodiments, further embodiments may include a thermal management system defined in a second duct, wherein the thermal management system is in fluid communication with the core gas path and the second duct inlet through the second duct.

In addition to one or more of the features described above, or as an alternative to any of the foregoing embodiments, wherein the gas generator includes a compressor section, a combustor section aft of the compressor section, and a turbine section aft of the combustor section wherein the compressor section, the combustor section, and the turbine section are aligned with the generator axis, wherein the generator axis is substantially parallel to the centerline axis.

In addition to one or more of the features described above, or as an alternative to any of the foregoing embodiments, wherein the propulsor includes a power turbine shaft aligned with the centerline axis extending forward from the power turbine, wherein the power turbine is configured to drive the fan through the power turbine shaft.

In addition to one or more of the features described above, or as an alternative to any of the foregoing embodiments, wherein the transition duct is angled relative to the centerline axis and the generator axis.

In addition to one or more of the features described above, or as an alternative to any of the foregoing embodiments, wherein at least a portion of the first duct is angled relative to the centerline axis and the generator axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE DISCLOSURE

Figure 1:
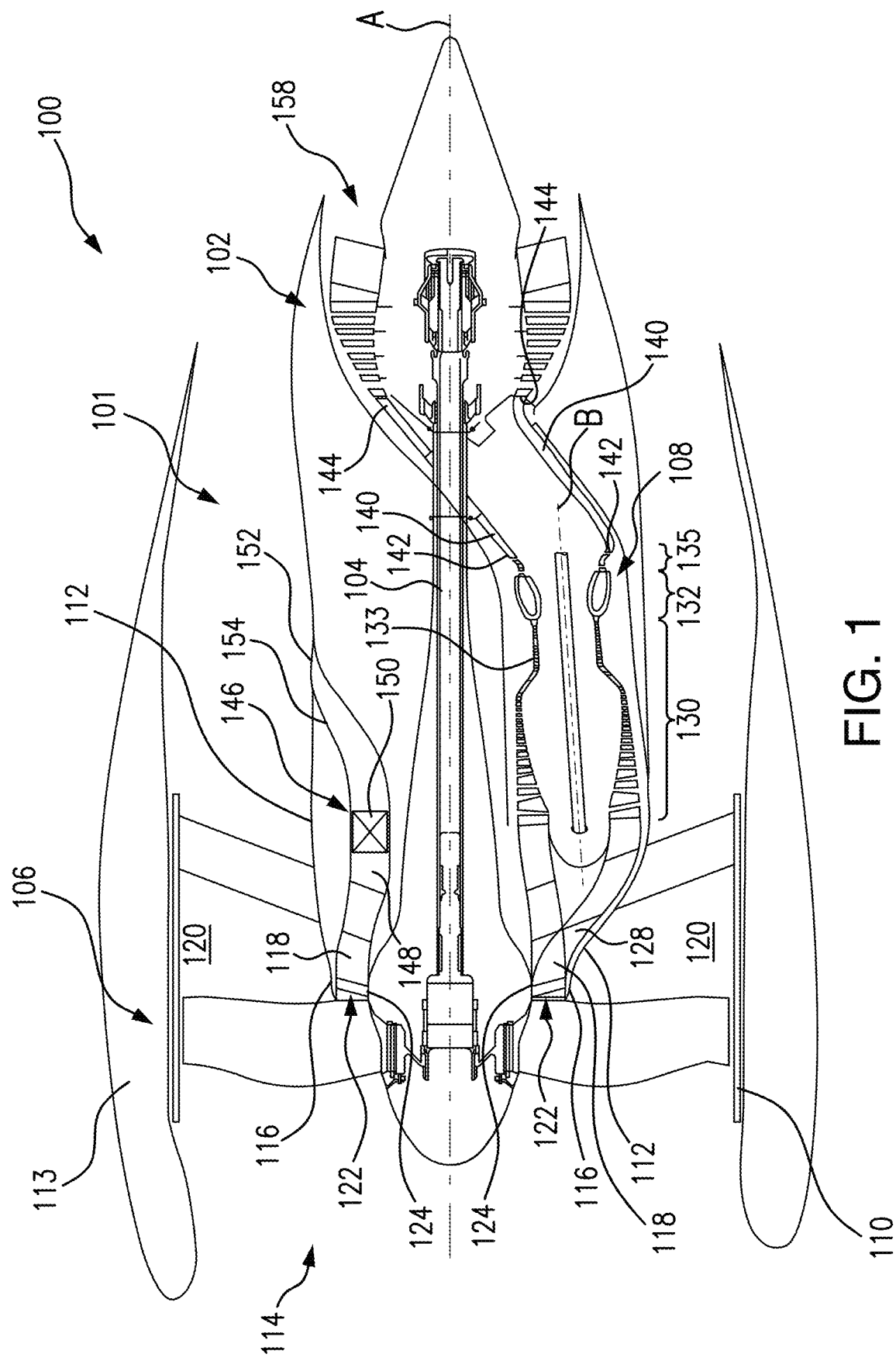
FIG. 1 is a schematic cross-sectional side elevation view of a gas turbine engine constructed in accordance with embodiments of the disclosure, showing the gas turbine engine with an offset gas generator.

Reference will now be made to the drawings wherein like reference numerals identify similar structural features or aspects of the subject disclosure. For purposes of explanation and illustration, and not limitation, an exemplary embodiment of a gas turbine engine in accordance with the disclosure is shown in FIG. 1 and is designated generally by reference character 100. Other embodiments of gas turbine engines in accordance with the disclosure, or aspects thereof, are provided in FIG. 2, as will be described.

As shown in FIG. 1, a gas turbine engine 100 includes a propulsor 101 having a power turbine 102 and a turbine shaft 104. Power turbine shaft 104 extends forward from power turbine 102 defining a centerline axis A. Propulsor 101 also includes a fan 106 aligned with centerline axis A forward of power turbine 102 and is operatively connected to be driven by power turbine 102 through power turbine shaft 104. A fan case 110 is defined radially outward of fan 106 along centerline axis A and includes a fan inlet 114. A nacelle 113 is defined radially outward of fan case 110. An outer core cowl 112 is radially inward of fan case 110 and defines an axially extending splitter 116 for dividing fluid flow entering at fan inlet 114 into a core gas path 118 and a bypass flow path 120. Core gas path 118 includes a core inlet 122 defined radially between splitter 116 and an inner core cowl 124.

With continued reference to FIG. 1, a gas generator 108 is defined downstream from fan 106 in core gas path 118 aft of core inlet 122. Gas generator 108 defines a generator axis B. Generator axis B is offset from centerline axis A. It is contemplated that generator axis B can be substantially parallel to centerline axis A. Gas generator 108 includes a compressor section 130 aligned with generator axis B. Compressor section 130 is operatively connected to power turbine 102 by way of a combustor section 132 and a turbine section 135 to supply combustion products for driving power turbine 102. Gas generator 108 includes a turbine shaft 133 defined along generator axis B. Those skilled in the art will readily appreciate that this allows turbine shaft 104 to be optimally sized for both torque and rotor-dynamics.

Gas turbine engine 100 includes a transition duct 140 defined between an exhaust outlet 142 of gas generator 108, e.g. an outlet of turbine section 135, and an inlet 144 of turbine 102 for providing fluid communication therebetween. Transition duct 140 is angled relative to centerline axis A and generator axis B. Those skilled in the art will readily appreciate that off-set gas generator 108 includes compressor section 130, combustor section 132 and turbine section 135, and is operatively connected to the same power turbine 102 that is driving fan 106. The exhaust from gas generator 108 is ducted to power turbine 102 through transition duct 140, and power turbine 102 drives fan 106, either through a fan drive gear system (FDGS) or a direct drive. The exhaust flow from gas generator 108 is evenly distributed between the top and bottom halves of transition duct 140 so that it uniformly feeds power turbine 102.

Figure 2:
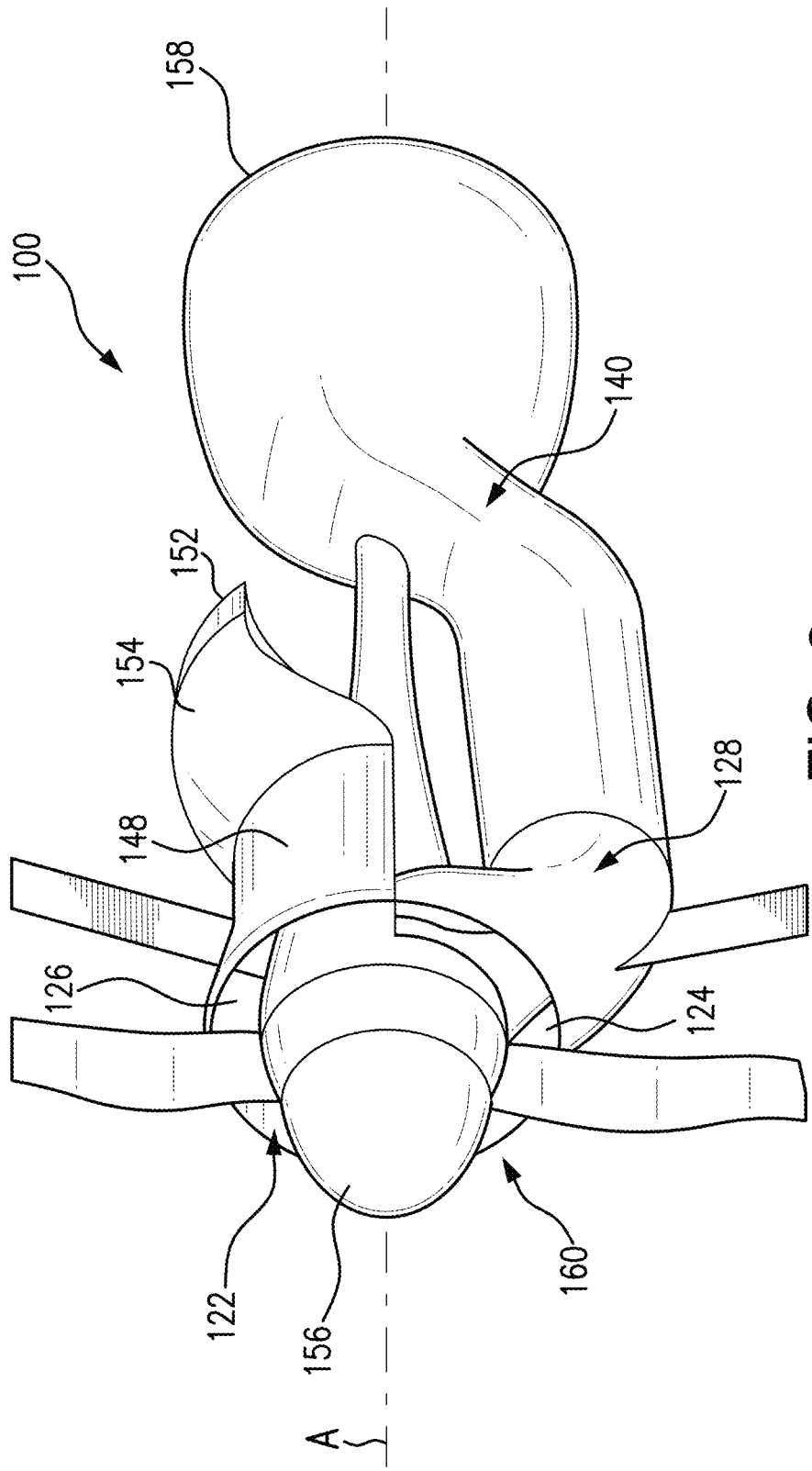
FIG. 2 is a schematic front perspective view of a portion of the gas turbine engine of FIG. 1, showing the core inlet segmented into first and second duct inlets.

As shown in FIG. 2, core inlet 122 is circumferentially segmented into a first duct inlet 124 and a second duct inlet 126. Gas generator 108, shown in FIG. 1, is in fluid communication with core inlet 122 and first duct inlet 124 through a first duct 128. First duct inlet 124 is defined in a bottom half 160 of core inlet 122. At least a portion of first duct 128 is angled relative to centerline axis A and generator duct axis B, shown in FIG. 1. Gas turbine engine 100 includes a hub 156 defined forward of core inlet 122. Hub 156 can be configured to direct flow to first and second duct inlets, 124 and 126, respectively. First and second duct inlets, 124 and 126, respectively, are configured to apportion incoming fluid flow evenly between first duct inlet 124 and second duct inlet 126. While the first and second duct inlets, 124 and 126, respectively, are shown herein as being divided evenly, those skilled in the art will readily appreciate that the proportions of first duct inlet 124 and second duct inlet 126 can vary as needed for a given application.

Now with reference to FIGS. 1 and 2, second duct inlet 126 is in fluid isolation from gas generator 108. It is contemplated that by segmenting core inlet 122, the second portion of air not needed for gas generator 108 can be diverted into second duct inlet 126 which can be used for a variety of suitable purposes, for example, a thermal management system 146. Thermal management system 146 includes a heat-exchanger 150 and is defined in a second duct 148 between second duct inlet 126 and a second duct outlet 152, e.g. an exhaust outlet. Thermal management system 146 is in fluid communication with core gas path 118 and second duct inlet 126 through second duct 148. By having second duct inlet 126 and second duct 148, air flow distortions around hub 156 tend to be mitigated as compared to if the air flow was taken into first duct inlet 124 alone. For example, if air flow was taken into first duct inlet 124 and there was no inlet on the top half of hub 156, e.g. second duct inlet 126, there would be significant fluid distortion, e.g. variation in flow rate and/or pressure, around the circumference of hub 156 and/or fan 106, which tends to factor into the propulsor efficiency potentially causing negative performance results in the engine. By drawing an equal amount air flow from the top of hub 156, the distortion downstream of the fan is mitigated, reducing performance losses.

With continued reference to FIGS. 1 and 2, second duct 148 includes an exhaust portion 154 with exhaust outlet 152 separate from and upstream of an exhaust outlet 158 of power turbine 102. Exhaust portion 154 is angled relative to centerline axis A. Exhaust outlet 152 is in fluid communication with bypass duct 120 for discharging the air flow thereto. Those skilled in the art will readily appreciate that while second duct 148 is described herein as having thermal management system 146 disposed therein, there are a variety of suitable auxiliary components and systems that can be disposed in second duct 148. For example, the air flow can be utilized as part of an anti-ice system, an environmental control system, and/or any other suitable auxiliary components and systems. It is contemplated that the above described components and systems can be disposed directly in second duct 148, and/or operatively connected thereto.

The systems, devices and methods of the present disclosure, as described above and shown in the drawings, provide for gas turbine engines with superior properties including increased engine efficiency due to reduced losses, increased thermal management efficiency, increased ease of design, assembly and maintenance, and reduction of overall weight. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gas turbine engine comprising:
a propulsor including a power turbine defining a centerline axis, and a fan aligned with the centerline axis forward of the power turbine operatively connected to be driven by the power turbine;
a fan case defined radially outward of the fan aligned with the centerline axis, wherein the fan case includes a fan inlet;
an outer core cowl radially inward of the fan case defining an axially extending splitter for dividing fluid flow entering at the fan inlet into a core gas path and a bypass flow path, wherein the core gas path includes a core inlet defined radially between the splitter and an inner core cowl, the core inlet being circumferentially segmented into a first duct inlet and a second duct inlet, the second duct inlet being in fluid isolation from the gas generator, and the first duct inlet is in fluid communication with the gas generator through the first duct, the inner core cowl being located between the outer core cowl and the centerline axis and the bypass flow path being located between the outer core cowl and the fan case;
a gas generator enclosed within the outer core cowl and located within the core gas path aft of the core inlet downstream from the fan and forward of the power turbine, the gas generator defining a generator axis offset from the centerline axis and wherein the fan extends radially and radially traverses the entire gas generator;
a first duct between the core inlet and the gas generator for fluid communication therebetween, wherein at least a portion of the first duct is angled relative to the centerline axis and the generator axis; and
a transition duct between an exhaust outlet of the gas generator and an inlet of the power turbine for fluid communication therebetween.

2. A gas turbine engine as recited in claim 1, further comprising a hub defined forward of the core inlet configured to direct flow to the first and second duct inlets, wherein the first and second duct inlets are configured to apportion incoming fluid flow evenly between the first duct inlet and the second duct inlet.

3. A gas turbine engine as recited in claim 1, further comprising a thermal management system defined in a second duct, wherein the thermal management system is in fluid communication with the core gas path and the second duct inlet through the second duct.

4. A gas turbine engine as recited in claim 1, wherein the gas generator includes a compressor section, a combustor section aft of the compressor section, and a turbine section aft of the combustor section wherein the compressor section, the combustor section, and the turbine section are aligned with the generator axis, wherein the generator axis is substantially parallel to the centerline axis.

5. A gas turbine engine as recited in claim 1, wherein the propulsor includes a power turbine shaft aligned with the centerline axis extending forward from the power turbine, wherein the power turbine is configured to drive the fan through the power turbine shaft.

6. A gas turbine engine as recited in claim 1, wherein the transition duct is angled relative to the centerline axis and the generator axis.

* * * * *